३,०२४,२२२
PREPARATION OF GLASSY POLYMERS
Meyer L. Freedman, Cleveland Heights, and Stanley B. Elliott, Bedford, Ohio, assignors to Ferro Chemical Corporation, Bedford, Ohio, a corporation of Ohio
No Drawing. Filed Feb. 9, 1959, Ser. No. 791,794
7 Claims. (Cl. 260—80)

This invention relates as indicated to substantially amorphous polymers and has more particular reference to the preparation of glassy polycarboxylic acid metal salts.

Salts of metals and organic acids, whether monomeric or polymeric, are well known to those skilled in organic chemistry. However, these metal-organo salts are crystalline materials which may decompose without melting.

Therefore, it is the principal object of the present invention to provide polycarboxylic acid metal salts having a high metal content in a bulk, glassy transparent form. Such polymeric materials will be found useful for structural plastics, films, fibers, optical purposes, absorption of nuclear radiation and special dielectric applications.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises a substantially amorphous heavy metal salt of an aromatic substituted polyacrylic acid, said metal selected from the class consisting of lead, zinc, and cadmium, and the method of producing the same.

We have discovered that to produce the substantially amorphous or glassy material the monomer acid must first be reacted with a compound of lead, zinc or cadmium to form the monomer salt and then the monomer salt is polymerized in a non-oxidizing atmosphere at high temperatures and in the presence of a free radicle addition polymerization catalyst to form the glassy polymer salt. This can be effectively accomplished, for example, by polymerizing the monomer salt of an aromatic substituted acrylic acid, such as beta phenyl acrylic acid, alpha phenyl acrylic acid and beta napthyl acrylic acid. Free radicle addition polymerization catalysts are a well known class of materials, and any of these may be used for effecting the polymerization of the heavy metal salts. Specific examples of such catalysts include, therefore, the organic peroxides such as ditertiary butyl peroxide, benzoyl peroxide, cumene hydroperoxide, etc. In the formation of the heavy metal monomer salts, any of the well known techniques for such salt formation may be employed, such as, for example, direct reaction of a basic metal material with an acidic reactant or methathetical reaction. For reaction with the foregoing organic acids, we may use, therefore, the oxides, hydroxides, acetates, formates, alcoholates, etc. of lead, zinc and cadmium to form the monomer salts.

In order that those skilled in the art better may understand how the present invention may be carried into effect, the following are illustrative examples of the preparation of these glassy materials.

*Example I*

2 mols of beta phenyl acrylic acid and 1 mol of PbO were mixed in a flask with sufficient toluene to make a fluid slurry. The flask was then connected to a reflux condenser and water trap and heated to the boiling point of the toluene for about 6 hours. The precipitate was then filtered and dried. The dried precipitate and 1% ditertiary butyl peroxide were placed in a flask with a nitrogen atmosphere (other inert gas may be used to prevent oxidation), heated to melting, and then heated in an oil bath at 400° F. for about 4 hours. The resultant molten material was then poured from the flask onto a sheet.

The lead polycinnamate thus produced was a transparent, amber colored, glassy solid, had a refractive index of 1.72 and a metal weight of 41.3%. The high refractive index 1.72 (normally 1.60 is considered high in organic polymers) of this polymeric material indicates also a high dielectric constant.

It is of importance to note here that while the monomer salt alone was used comonomers and plasticizers can also be used.

As comonomers, other unsaturated compounds may be mixed with the monomer salt before polymerization. These should have a boiling point higher than the temperature of polymerization and must be completely miscible with the molten monomer salt. Suitable comonomers for the practice of this invention are cinnamic acid and vinyl carbazole. The comonomers may be added in amounts up to 50% of the total mixture weight. Addition of minor amounts of such comonomers is advantageous in lowering the melting point of the mixture.

Plasticizers may be added before polymerization in order to soften the resulting polymer. Such plasticizers must be miscible with the molten monomer salt mixture and should not be appreciably volatile at polymerization temperatures. Chlorinated polyphenyls (commercially available under the trade name "Aroclor") are suitable plasticizers. They should preferably be used in concentrations below 35% by weight in order to obtain rigid polymers.

Also it is to be noted that in the above and following examples the fusion method of preparing the monomer salt is used. However, the precipitation method is equally effective. For example, cinnamic acid can be dissolved in water containing ammonia to form ammonium cinnamate and then a solution of lead acetate can be added which will precipitate lead cinnamate which can be filtered, dried and polymerized. Still further, solution polymerization as well as bulk polymerization can be used to produce the finished glassy material. For example, the monomer lead cinnamate of the aforegoing example could be dissolved in dimethyl formamide and heated to produce the polymerized material.

Other monomer salts suitable for the practice of this invention are as follows:

*Example II*

Cadmium cinnamate monomer was produced by reacting 2 mols of cinnamic acid with 1 mol of cadmium oxide in the presence of a sufficient amount of toluene to make a fluid slurry. The reactants were then refluxed as in Example I for a period of 6 hours. The precipitate was then filtered and dried.

The resulting dried precipitate and 1% by weight of ditertiary butyl peroxide were placed in a flask, and the normal ambient atmosphere displaced with nitrogen. The entire mass was heated to a temperature of about 400° F. for a period of 4 hours. The molten material was then poured from the flask onto a sheet. Polymerized cadmium cinnamate was produced by a refractive index of 1.67, a metal content of 27.6%, a fusion point of 470° F., and the product was soluble in "Aroclor," dimethyl formamide and dimethyl sulphoxide.

*Example III*

Following the same procedure as given in Example I, zinc oxide was reacted with cinnamic acid in a mol ratio of 1:2 respectively. The zinc cinnamate monomer was recovered in the fashion of Example I, the precipitate filtered, dried and admixed with a free radicle addition polymerization catalyst, ditertiary butyl peroxide, and polymerization in a flask in an inert gas atmosphere (nitrogen) at a high temperature over an oil bath maintained at about 400° F. for a period of about 4 hours. The molten material was poured from the flask onto a sheet. The resultant polymerized zinc cinnamate had a refractive index of 1.66, a metal content of 18.1% by weight, a fusion point of 400° F., and the product was soluble in "Aroclor" and dimethyl sulphoxide.

*Example IV*

In place of the lead oxide of Example I, a chemically equivalent amount of lead hydroxide may be used.

*Example V*

Following the procedure of Example III, a chemically equivalent amount of zinc hydroxide may be used in place of zinc oxide.

Any inert gas, e.g. carbon dioxide, helium, nitrogen or the like, may be used to provide the non-oxidizing atmosphere.

The foregoing examples are for illustrative purposes only and not intended to limit the scope of the invention to the precise scope thereof. Obviously many other methods of producing the monomeric heavy metal salts of the aromatic substituted acrylic acids may be employed without departing from the spirit of the invention.

Thus from the foregoing disclosure it will be readily seen that we have provided a glassy polymeric heavy metal salt of an aromatic substituted acrylic acid, which material has a high metal content and a high refractive index.

The application is a continuation-in-part of our copending application Ser. No. 586,915, filed May 24, 1956.

Other modes of applying the principle of the invention may be employed, change being made as regard the details described, provided the features stated in any of the following claims or the equivalent of such be employed.

We, therefore, particularly point out and distinctly claim as our invention.

1. The method of producing a substantially amorphous polymeric divalent heavy metal salt of an aromatic substituted acrylic acid selected from the group consisting of the lead, cadmium, and zinc salts respectively, of beta phenyl acrylic acid which comprises polymerizing the monomeric heavy metal salt in the molten state in the presence of a free radical addition polymerization catalyst, and in a non-oxidizing atmosphere.

2. The method of producing a substantially amorphous polymeric divalent lead cinnamate which comprises polymerizing monomeric lead cinnamate in the molten state in the presence of a free radicle addition polymerization catalyst, and in a non-oxidizing atmosphere.

3. The method of producing a substantially amorphous polymeric divalent cadmium cinnamate which comprises polymerizing monomeric cadmium cinnamate in the molten state in the presence of a free radicle addition polymerization catalyst, and in a non-oxidizing atmosphere.

4. The method of producing a substantially amorphous polymeric divalent zinc cinnamate produced in accordance with the process which comprises polymerizing monomeric zinc cinnamate in the molten state in the presence of a free radicle addition polymerization catalyst, and in a non-oxidizing atmosphere.

5. The substantially amorphous polymeric divalent lead cinnamate produced in accordance with the process of claim 2.

6. The substantially amorphous polymeric divalent cadmium cinnamate produced in accordance with the process of claim 3.

7. The substantially amorphous polymeric divalent zinc cinnamate produced in accordance with the process of claim 4.

References Cited in the file of this patent

UNITED STATES PATENTS

| | | |
|---|---|---|
| 2,253,128 | Langhammerer | Aug. 19, 1941 |
| 2,401,348 | Hauser et al. | June 4, 1946 |
| 2,875,166 | Hopkins | Feb. 24, 1959 |